United States Patent Office 3,437,564
Patented Apr. 8, 1969

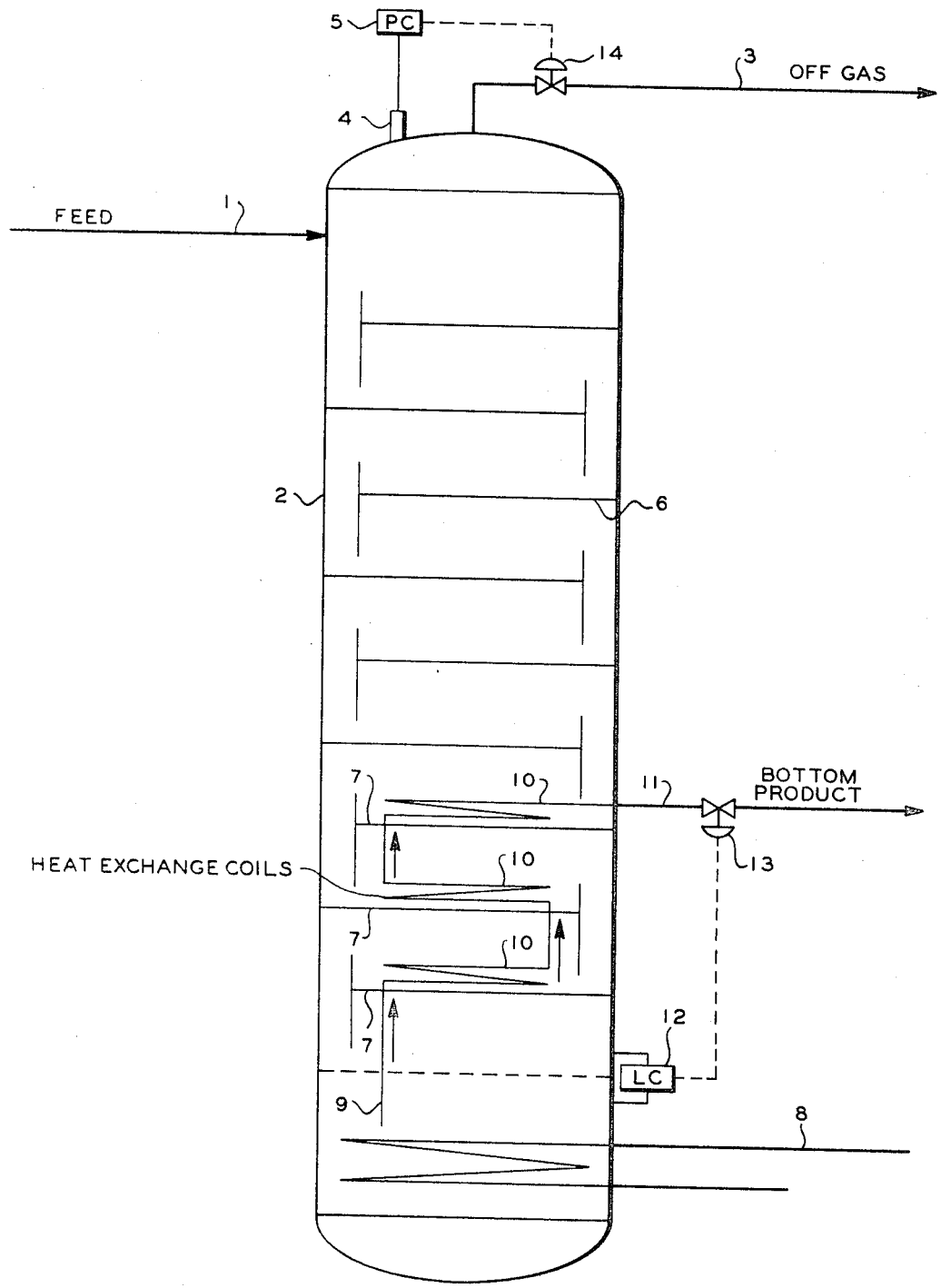

3,437,564
PURIFICATION OF CYCLOHEXANE BY FRAC-
TIONAL DISTILLATION WITH BOTTOMS
STREAM HEAT EXCHANGE
Ronald E. Bridgeford, Bartlesville, Okla., assignor to
Phillips Petroleum Company, a corporation of
Delaware
Filed Mar. 21, 1966, Ser. No. 536,064
Int. Cl. B01d 3/32, 3/14
U.S. Cl. 203—25       3 Claims This invention relates to fractionation. In one of its aspects, it relates to a method of separating hydrocarbon components comprising delivering feed of said components to a fractionation zone at bubble point, removing overhead vapor without reflux, removing liquid from the bottom of the zone and indirectly heat exchanging the bottom liquid with downflowing liquid in the fractionation zone. In another of its aspects, the invention relates to a method of separating hydrocarbon components as hereinbefore described wherein the liquid in the bottom of the fractionator is countercurrently heat exchanged with the downflowing liquid in the fractionation tower and is then removed as a product. In a still further aspect, the invention relates to a method of separating hydrocarbon components as hereinbefore described wherein cyclohexane is stabilized by removal of hydrogen and light hydrocarbons. In a still further aspect, the invention relates to a method of separating hydrocarbon components as hereinbefore described wherein a reboiler is used to supply heat to the liquid in the bottom of the fractionator zone. In a still further aspect, the invention relates to a method of separaing hydrocarbon components as hereinbefore described wherein the indirect heat exchange takes place with the downcoming liquid on trays in the fractionation zone near the bottom thereof.

The invention also relates to an apparatus comprising a fractionator tower, means to feed a liquid hydrocarbon mixture to the top portion of said tower, means to remove overhead from said tower, fractionation trays, means for heating the liquid in the bottom of said tower, means for removing liquid from the bottom of said fractionation tower, and means for indirectly heat exchanging said liquid removed from the bottom of said fractionation tower with the liquid flowing downwardly in said tower. In a still further aspect, the invention relates to an apparatus as hereinbefore described where said means for indirectly heat exchanging countercurrently contacts the liquid flowing down the tower. In a still further aspect, the invention relates to an apparatus as hereinbefore described wherein said heat exchange means comprise a plurality of coils on fractionation trays near the bottom portion of the fractionation tower.

In the stabilization of cyclohexane, feed is normally introduced to the top part of a fractionation tower at bubble point temperature, about 100° F. Some hydrogen and lighter hydrocarbons are immediately flashed off in the overhead as feed enters the tower. The tower is generally operated without reflux. As the liquid product flows down the tower, it is heated to approximately 360° F. to complete the vaporization of lighter products from the cyclohexane. Heat is usually supplied to the tower by a reboiler in the bottom of the tower. Since the vapor flow in the column is very small compared with the liquid flow, most of the heat required by the reboiler is used in heating the liquid from 100° F. on the top tray to about 360° F. in the bottom. The liquid cyclohexane product in the bottom of the column must be cooled before being further processed. Since the feed to the tower must be introduced at 100° F., the bubble point of the liquid, it is not possible to heat exchange the bottom product with the incoming feed to the tower.

I have now discovered that the heat requirements for a tower can be substantially reduced by heat exchanging the bottom product indirectly with the downflowing liquid in the column. By practice of a preferred embodiment of the invention, heat requirements for the tower can be reduced about 75 percent.

It is an object of this invention to provide a method and apparatus for separating hydrocarbons wherein the heat required to carry out the operation is minimized.

It is a further object of this invention to provide a method and apparatus for stabilizing cyclohexane with a minimum of heat supply to the operation.

It is a still further object of this invention to provide a method and apparatus for stabilizing cyclohexane wherein the cooling of the cyclohexane product is minimized.

Other aspects, objects, and the several advantages of this invention are apparent to one skilled in the art from a study of this disclosure, the drawing and the appended claims.

According to the invention, a separation process takes place by passing the feed to the top portion of a fractionation tower, removing overhead vapors without reflux, passing the liquid down the tower, thereby heating the same as it flows down the tower, supplying heat to the bottom of the tower to heat the liquid, withdrawing the liquid product from the bottom of the tower and indirectly heat exchanging same with liquid flowing down the column as it is removed. According to a preferred embodiment of the invention, the liquid product is countercurrently heat exchanged with the liquid flowing down the column. In another embodiment of the invention, the heat exchanging takes place on fractionation trays located near the bottom of the fractionation tower. According to another embodiment, the feed is a hydrocarbon feed containing volatile materials.

The invention will now be described with reference to the accompanying drawing which shows an embodiment of the invention.

Referring now to the drawing which will be described with regard to a stabilization process for cyclohexane, a cyclohexane feed containing hydrogen and light hydrocarbon components is introduced through line 1 at about 100° F. to fractionation tower 2. The feed is preferably introduced at bubble point. Overhead vapors are removed through line 3, the overhead vapors containing hydrogen and light hydrocarbon components. The flow of vapor through line 3 is controlled by valve 14 actuated by pressure controller 5 according to the pressure in the top of the fractionation tower 2 sensed by pressure sensing means 4. Preferably, no reflux to the tower from the overhead vapor is provided. A plurality of fractionation trays 6 and 7 are provided along a tower. As the liquid flows down the tower, it is heated from about 100° F. to about 360° F. The heating is required in the case of cyclohexane stabilization to drive off all the lighter components. A reboiler 8 is provided in the bottom of the column to supply heat to the liquid therein to aid in heating the liquid in the column. Liquid product containing about 99.8 percent cyclohexane is removed through line 9, passed through heat exchangers 10 which indirectly heat exchange with the liquid on trays 7 and through line 11. Heat exchangers 10 can be any suitable heat exchanger as for example a flat coil which is adapted to transfer heat from the liquid in line 9 to the liquid on the trays 7. In the heat exchanging operation, the liquid product is cooled from about 360° F. to about 140° F., thus minimizing the required external cooling for the product. The flow of liquid product through line 11 is controlled by valve 13 which is adjusted in accordance with the level of liquid sensed by liquid level controller 12. In the stabilization process of cyclohexane, it is necessary to heat the cyclohexane to about 360° F. for substantial removal of the hydrogen and light hydrocarbon components.

It has been found that with regard to stabilization of cyclohexane as hereinbefore described, the steam requirements for heating have been reduced from about $18,000 per year to about $5,000 per year, about a 75 percent decrease in steam requirements. Obviously, the decrease in steam requirements allows a smaller reboiler to be used. Further, the cooling of the product by the heat exchangers within the tower reduce the need for heat exchangers to cool the product outside of the tower.

The invention will be further exemplified by the following material balance.

Operating conditions

Tower (2):
| | |
|---|---|
| Top temp., ° F. | 100 |
| Bottom temp., ° F. | 360 |
| Pressure, p.s.i.a. | 150 |
| Side draw, ° F. | 140 |

Feed (1):
| | |
|---|---|
| Mols/hour | 280.07 |
| Composition, mold/hr.: | |
| Hydrogen | 2.47 |
| Methane | 4.37 |
| Cyclohexane | 273.23 |
| Temperature, ° F. | [1] 100 |

Bottoms product (11):
| | |
|---|---|
| Mols/hour | 273.40 |
| Composition, mols/hr.: | |
| Methane | 0.36 |
| Cyclohexane | 273.04 |
| Temperature, ° F. | 140 |

Off gas (3):
| | |
|---|---|
| Mols/hour | 6.67 |
| Composition, mols/hr.: | |
| Hydrogen | 2.47 |
| Methane | 4.01 |
| Cyclohexane | 0.19 |
| Temperature, ° F. | 100 |

[1] At bubble point. Savings in reboil heat cost over bottom product removal at 350° F. is $13,000 per year. Further savings are realized since no external reflux is required by this invention.

While the invention has been generally described with reference to a cyclohexane stabilization process, it is obvious that the invention can be applied to other separation and/or stabilization processes.

Reasonable variation and modification are possible within the scope of the foregoing disclosure, the drawing and the appended claims to the invention, the essence of which is that a separation process and apparatus has been provided wherein the overhead is removed from a fractionation tower without refluxing the same, liquid is heated as it moves down the tower, bottoms product is indirectly heat exchanged with the downwardly flowing liquid as it is removed from the column.

I claim:
1. A method of purifying a liquid cyclohexane stream which contains small quantities of relatively low boiling point normally gaseous contaminants, which method comprises:
  (a) passing said liquid stream at its bubble point to the top of a multitray fractionation zone thereby causing a major portion of said contaminants and substantially none of said cyclohexane to vaporize;
  (b) removing overhead vapor without refluxing from said top portion of said fractionation zone;
  (c) passing the resulting liquid from step (a) downward through said fractionation zone;
  (d) heating the bottom of said fractionation zone to a temperature of about 360° F.;
  (e) removing liquid cyclohexane from the bottom of said fractionation zone and indirectly heat exchanging the same with downflowing liquid, said heat exchanging taking place solely within the lower portion of said fractionation zone; and
  (f) withdrawing the heat exchanged liquid cyclohexane from the fractionation zone immediately following heat exchanging step (e).

2. The method of claim 1 wherein said contaminants comprise hydrogen and light hydrocarbon components.

3. The method of claim 2 wherein said liquid stream is passed to said fractionation zone at about 100° F. and is cooled to about 140° F. by the heat exchanging step (e).

References Cited

UNITED STATES PATENTS

| | | | |
|---|---|---|---|
| 1,443,742 | 1/1923 | Hess | 208—365 |
| 1,662,105 | 3/1928 | Doherty | 208—353 |
| 1,769,698 | 7/1930 | Laird | 208—353 |
| 1,823,897 | 9/1931 | Hall | 208—353 |
| 1,842,181 | 1/1932 | Laird | 208—353 |
| 2,477,595 | 8/1949 | Goldsbarry | 203—25 |
| 2,995,499 | 8/1961 | Dukler et al. | 208—353 |
| 3,121,056 | 2/1964 | Hull | 203—25 |
| 3,211,797 | 10/1965 | Houston | 260—666 |

WILBUR L. BASCOMB, *Primary Examiner.*

U.S. Cl. X.R.

203—99; 260—666; 208—353